(12) United States Patent
Coudurier

(10) Patent No.: US 8,261,414 B2
(45) Date of Patent: Sep. 11, 2012

(54) HOLDER FOR CULINARY UTENSIL

(75) Inventor: Olivier Coudurier, Pringy (FR)

(73) Assignee: SEB SA, Ecully (FR)

( * ) Notice: Subject to any disclaimer, the term of this patent is extended or adjusted under 35 U.S.C. 154(b) by 71 days.

(21) Appl. No.: 12/281,775

(22) PCT Filed: Feb. 23, 2007

(86) PCT No.: PCT/FR2007/000331
§ 371 (c)(1),
(2), (4) Date: Dec. 29, 2008

(87) PCT Pub. No.: WO2007/101926
PCT Pub. Date: Sep. 13, 2007

(65) Prior Publication Data
US 2009/0199366 A1    Aug. 13, 2009

(30) Foreign Application Priority Data
Mar. 6, 2006  (FR) .................................... 06 01985

(51) Int. Cl.
*B25G 3/32* (2006.01)
(52) U.S. Cl. ............... 16/422; 16/427; 74/544
(58) Field of Classification Search ............ 16/110.1, 16/422, 425–427, DIG. 24; 74/544, 543; 220/759, 762–764; 81/489
See application file for complete search history.

(56) References Cited

U.S. PATENT DOCUMENTS

| 2,965,405 | A | * | 12/1960 | Herrick | 294/27.1 |
| 4,724,576 | A | * | 2/1988 | Tatematsu | 220/763 |
| 5,373,608 | A | * | 12/1994 | Welch | 16/425 |
| 5,660,300 | A | * | 8/1997 | Demetrio | 220/763 |
| 6,220,477 | B1 | * | 4/2001 | Schneider | 220/763 |
| 6,260,733 | B1 | * | 7/2001 | Eimerman | 220/759 |
| 6,341,714 | B1 | * | 1/2002 | Bogani | 220/759 |
| 6,439,420 | B1 | * | 8/2002 | Park | 220/759 |
| 6,910,248 | B2 | * | 6/2005 | Fiocco | 16/406 |
| 7,028,374 | B2 | * | 4/2006 | Fiocco | 16/422 |
| 7,165,489 | B1 | * | 1/2007 | Fernandez et al. | 99/422 |
| 2009/0193626 | A1 | * | 8/2009 | Boes | 16/425 |

FOREIGN PATENT DOCUMENTS
EP  0247229 A1  12/1987
EP  0809962 B1  9/1999

* cited by examiner

*Primary Examiner* — William L. Miller
(74) *Attorney, Agent, or Firm* — Bachman & LaPointe, P.C.

(57) ABSTRACT

A holder comprising on the one hand a base designed for fixing on a culinary item, and comprises a use positioning member and a rotary shaft, and on the other hand a handle pivoting on the rotary shaft and a lock mounted in such a way that it can move between a locked position in which it engages with the use positioning member in such a way as to immobilize the handle and a release position in which it allows it to be rotated. The use positioning member is on the rotary shaft.

7 Claims, 1 Drawing Sheet

HOLDER FOR CULINARY UTENSIL

BACKGROUND OF THE INVENTION

This invention relates to a holder for a kitchen utensil with a rotary handle.

A holder is known of the type comprising, on the one hand, a stand that is adapted to be fixed onto a culinary accessory, which comprises at least one use positioning member and a rotary shaft extending according to an axis of rotation, and, on the other hand, a handle which comprises a body with an opening that engages with the rotary shaft so as to permit the rotation of the handle according to the axis of rotation between a use position and at least one storage position, and a lock with a mounting on the body that is mobile between a locking position in which it engages with the use positioning member so as to immobilise the handle in its use position and a releasing position in which it allows the handle to rotate.

However, use positioning members are often located in positions that impose constraints as concerns the design of the holder.

SUMMARY OF THE INVENTION

According to the invention, the use positioning member is held by the rotary shaft. Consequently, it is very easy to hide this member due to the short distance it travels when the handle rotates, even for large angular amplitudes.

BRIEF DESCRIPTION OF THE DRAWINGS

Other specific features and advantages of this invention will become clearer in the description of the embodiment provided by way of non-restrictive example and illustrated in the drawings in which.

DETAILED DESCRIPTION OF THE PREFERRED EMBODIMENT(S)

Figure 2:
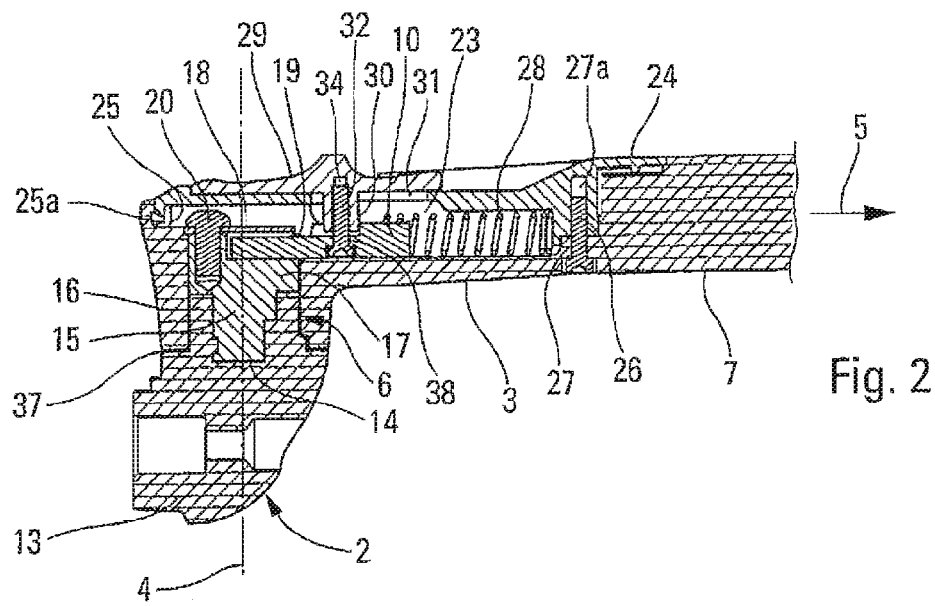
FIG. 2 is a cross sectional view of the part of the holder adjacent to the axis of rotation.
Figure 1:
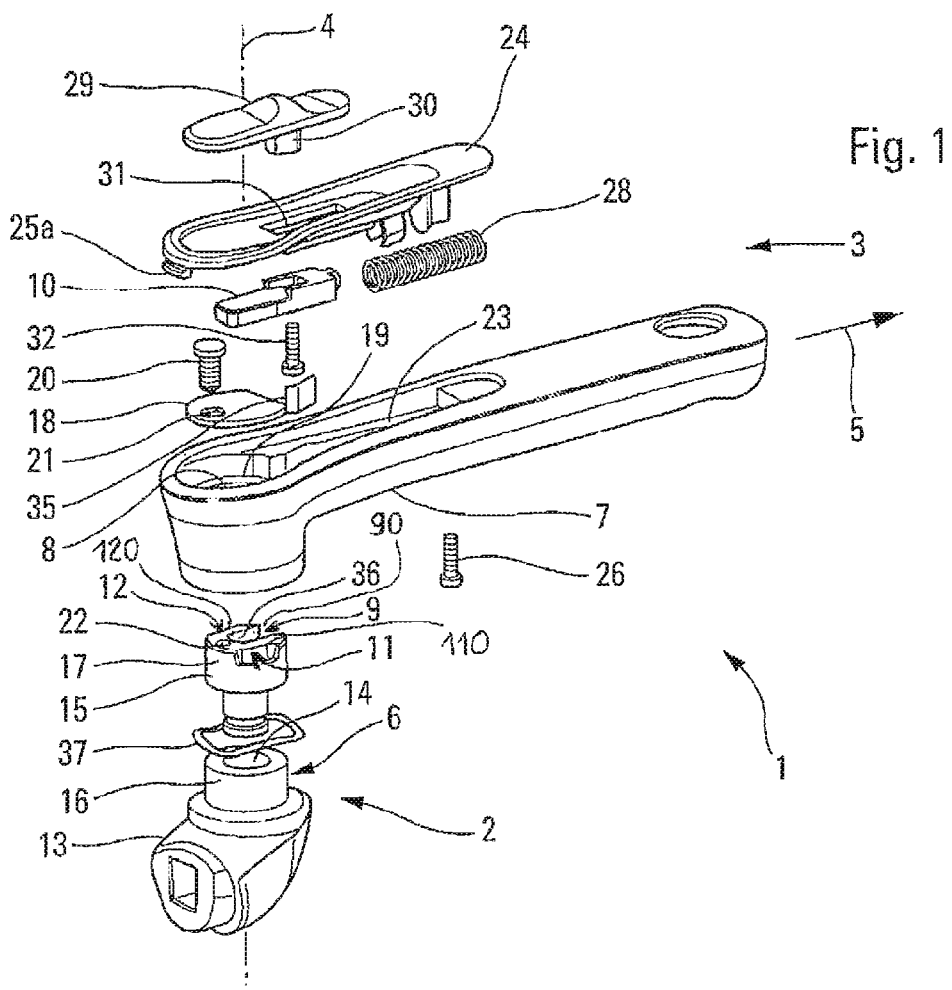
FIG. 1 is an exploded perspective view of a holder compliant with the embodiment of the invention.

Usually, a culinary utensil such a saucepan or frying pan comprises a recipient and a holder 1. As may be seen in FIGS. 1 and 2, the holder 1 compliant with the invention comprises a stand 2, that is adapted to be fixed onto a recipient of a culinary accessory, and a handle 3, that is mounted so that it pivots with respect to the stand 2 according to an axis of rotation 4 and which extends mainly according to a longitudinal direction 5 that is perpendicular to the axis of rotation 4.

The stand 2 comprises a rotary shaft 6 which extends according to the axis of rotation so that the handle is rotated according to a horizontal plane when the culinary utensil is suitably positioned on a work surface. Preferably, in order to reduce the height when several culinary utensils are stacked on top of one another, the holder 1 is conformed so that the bases of the stacked recipients remain parallel to one another, regardless of the position of the handle.

The handle 3 comprises a body 7 that forms the essential part of the handle 3 and that has an opening 8 which engages with the positioning device 15 so as to permit the handle 3 to rotate between a use position in which, when the holder 1 is attached to the lateral wall of a recipient, it extends perpendicularly to this wall, and at least one storage position (in this case two, according to the direction of rotation used to move it from its use position) in which, when the holder 1 is attached to the lateral wall, it preferably extends substantially tangentially to the latter. Consequently, in the storage position, the size of the culinary utensil is particularly reduced.

Furthermore, the stand 2 comprises a use positioning member 9 and the handle 3 comprises a lock 10 that is mounted mobile on the body 7 between a locking position in which it engages with the use positioning member 9 so as to immobilise the handle 3 in its use position and a releasing position in which it allows the handle 3 to rotate freely. In this case, the use positioning member 9 is formed by a use positioning cavity 90 inside which the lock 10 penetrates when it is in the locking position (and when the handle 3 is in its use position). In the invention, the use positioning member 9 is held by the positioning device 15, and more precisely, in this embodiment, the use positioning cavity 90 is made inside of the positioning device 15.

Furthermore, the positioning device 15 has at least one additional positioning member 11, 12 (in this case two, positioned symmetrically with respect to the use positioning member 9) with which the lock 10 is adapted to engage when it is in the locking position so as to immobilise the handle 3 in its corresponding storage position. In this embodiment, each additional positioning member 11, 12 is formed by an additional positioning cavity 110, 120 also made in the positioning device 15. It should be noted that the depth of the two additional positioning cavities 110, 120 is considerably shallower than that of the use positioning cavity 90 so as to permit the three cavities 90, 110, 120 to be made in the positioning device 15 and in view of the degree of safety that is to be provided for the stability of the handle 3 when the culinary utensil is used.

In this embodiment, the stand 2 comprises, on the one hand, a base 13 (in general moulded from a thermosetting material) that is adapted to be fixed to the recipient and in which a housing 14 is made, and, on the other hand, the positioning device 15 (in general metallic) that is fixed inside the housing 14 and which holds the positioning members 9, 11, 12. The rotary shaft 6 is, on the one hand, formed by a cylindrical flange 16 that is held by the base and which defines the housing 14, and, on the other hand, holds the positioning device 15 including a shoulder 17 which extends from the flange 16. The positioning members 9, 11, 12 are made at the external periphery of the shoulder 17 so as to be accessible from the outside of the stand 2 by the lock 10.

The opening 8 in the body 7 has an axial end that is obstructed by a stop 18 which is in contact with the free end of the rotary shaft 6 in order to prevent any axial movement of the handle 3 with respect to the stand 2. In this embodiment, the stop 18 is formed by a plate which is also in contact with an annular shoulder 19 made in the opening 8 and that is fixed to the stand 2 by a screw 20 which passes through a hole 21 drilled in the plate 18 and which penetrates a threaded orifice 22 in the stand 2 (and more precisely in the positioning device 15). The forms of the above-cited plate and the annular shoulder 19 permit them to rotate with respect to one another when the handle 3 is pivoted.

The lock 10 is mounted so that it slides in translation according to the longitudinal direction 5. It is housed in a groove 23 which is realised in the body 7 and which opens into the opening 8. The groove 23 is covered by a cover 24 attached to the body 7. In this case, it is attached, on the one hand, by a bracket 25 that is held by the cover 24 and that is adapted to be fitted into a housing 25 in the body 7, and, on the other hand, by a screw 26 that passes through a hole 27 drilled in the body 7 and that penetrates a threaded orifice 28 in the cover 24.

In this embodiment, to improve the locking safety of the handle 3 in its use position, the lock 10 is solicited in its locking position by a locking spring 28. The later is positioned in the groove 23 and is in contact with the body 7 and the lock 10.

Given that the lock 10 is positioned in a groove 23 covered by a cover 24, in order to be able to drive it easily into its releasing position, the handle 3 comprises a manual control button 29 that is accessible from the outside of the handle 3. The manual control button 29 is connected to the lock 10 by a tenon 30 that passes through a slot 31 in the cover 24, and is attached to it by a screw 32 which passes through a hole 33 drilled in the lock 10 and which penetrates a threaded orifice 34 in the tenon 30 held by the manual control button 29.

In order to minimise or even prevent any rotation of the handle 3 with respect to the stand 2 due to a difference in width between the lock 10 and the various positioning cavities 90, 110, 120, a locking spring 35 (in this case a spring blade 35 positioned in the groove 23 and in contact with the body 7 and the lock 10) solicits the lock 10 to come against a radial surface 36 of the positioning member 9, 11, 12 when, in the locking position, it engages with this member. The width of the lock 10 (or a cavity 90, 110, 120) is the distance separating the two longitudinal surfaces of the lock 10 (respectively the two radial surfaces of the cavity 90, 110, 120).

Furthermore, the holder 1 comprises an elastic sliding washer 37 (ripple, made of stainless steel) that is fitted around the rotary shaft 6, which rests on the shoulder at the base of the flange 16 and onto which the handle 3 comes into contact.

A user wishing to pivot the handle 3 moves the manual control button 29 in the releasing direction of the lock 10 (in this case moving it away from the recipient) and pivots the handle 3. Once the control button 29 has been released, the lock 10 comes into contact with the positioning device 15 and, when the handle 3 is in one of the positions where it may be locked, it penetrates the corresponding cavity in order to immobilise the latter.

Obviously, this invention is not restricted to the embodiment that has just been described.

The invention claimed is:

1. A holder comprising:
   a stand to be fixed onto a culinary accessory, and which comprises a rotary shaft extending according to an axis of rotation, and a use positioning device fixedly held by said rotary shaft and including at least one positioning member, and,
   a handle which comprises a body with an opening that engages with said use positioning device so as to permit rotation of the handle around the axis of rotation with respect to said use positioning device, between a use position and at least one storage position, and a lock that is mounted mobile on the body between a locking position in which the lock engages with said at least one positioning member so as to immobilize the handle in the use position, and, a releasing position in which the lock is disengaged from said at least one positioning member, so as to allow the handle to rotate to the at least one storage position.

2. The holder according to claim 1, wherein the use positioning device engages an upper face of the rotary shaft when the stand is fixed to the culinary accessory.

3. The holder according to claim 1, wherein the use positioning device includes at least one additional positioning member with which the lock engages when the lock is in the locked position, so as to immobilize the handle in a corresponding storage position.

4. The holder according to claim 1, wherein the lock is mounted so that the lock slides in translation according to a longitudinal direction of the body.

5. The holder according to claim 1, wherein the lock is solicited in the locking position to come against a radial surface of said at least one positioning member by a locking spring in order to limit the rotation between the handle and the stand.

6. The holder according to claim 1, wherein the lock is housed in a groove in the body which opens into the opening.

7. The holder according to claim 6, wherein the groove is sealed by a cover in which a slot is made, and a tenon passes through the slot (31) in the cover (24), so as to attach the lock to a manual control button.

* * * * *